Patented June 3, 1924.

1,496,065

UNITED STATES PATENT OFFICE.

EUGENE L. MAUPAI, OF NEW YORK, N. Y.

PROCESS OF TREATING SILK.

No Drawing. Application filed March 31, 1923. Serial No. 629,167.

*To all whom it may concern:*

Be it known that I, EUGENE L. MAUPAI, a citizen of the United States of America, residing at New York city, county, and State of New York, have invented certain new and useful Improvements in Processes of Treating Silk, of which the following is a specification.

My invention relates to improvements in processes of treating grege or raw silk in order to weight the same with metallic salts or solutions, the object being to so treat the raw silk that it will more readily retain the weighting solutions and whereby a very high percentage of weighting is possible.

In carrying out my process, I first partially weight the grege or raw silk by impregnation in a tin solution until the silk holds a percentage of 20% to 25% weighting material.

I then subject the silk thus partially weighted to an alkali (commercial sodium phosphate ($Na_2HPO_4+12H_2O$) for instance) in order to neutralize the acids. I thereupon subject the silk to a hardening treatment so as to produce an insulation or hardening of the fatty or cereceous substances contained in and around the silk fibres. For this purpose I may use a metallic salt diluted in water, such for instance as chromium chloride, ferrous nitrite of iron or alum. To produce this hardening, I may employ the method described in my U. S. Patent, No. 1,352,014, dated September 7th, 1920. I then wash the silk again and thereupon I subject the silk to a final weighting treatment by impregnating the same in any of the well known weighting solutions. I thereupon again neutralize the metallic salts by subjecting the silk to an alkali bath, such for instance as commercial sodium phosphate. Thereupon the silk is sometimes first washed and then dyed; at other times first woven, degummed and dyed in the piece, as may be desired.

By the use of my improved process, which in general consists in first partially weighting the raw silk, then hardening the fibres and then finally subjecting to an additional weighting treatment, I find that the fibres will hold a very high percentage of metallic weighting substances without throwing the silk, and furthermore I also find that when weighted by my process, the silk will absorb the colors more readily and remain fast to alkali and light.

What I desire to secure by Letters Patent is:—

1. A process of treating grege silk which consists in first partially weighting the silk with metallic substances, then hardening the silk fibres and finally saturating the silk with an additional weighting solution.

2. A process of treating raw silk, which consists in first weighting the silk with approximately 20% of weighting material, then hardening the gummy substances contained in the silk, and finally saturating the silk with a tin weighting solution.

3. A process of treating silk, which consists in first impregnating the raw silk in a tin weighting solution so that the silk will contain approximately 20% of weighting substances, thereupon subjecting the silk to the action of a metallic hardening solution, and then again impregnating the silk in a tin weighting solution.

4. The art of tin weighting raw silk, which consists in first preliminarily weighting the silk with metallic substances, thereupon hardening the silk fibres with a metallic salt, and finally impregnating the silk in a metallic weighting solution.

5. The process of treating raw silk, which consists in initially weighting the silk with a tin solution, thereupon hardening the gummy substances in and on the silk, and then finally again impregnating the silk in a tin solution.

6. A process of treating silk, which consists in first partially weighting it by impregnation in a tin solution so that it will contain approximately 20% to 25% of the metallic weighting substance, then subjecting the silk to an alkali bath to neutralize the acids, then subjecting the silk to a hardening solution, then washing the silk, and thereupon finally impregnating the silk in a tin solution substantially as and for the purpose described.

7. A process of treating silk, which consists in first partially weighting it by impregnation in a tin solution so that it will contain approximately 20% to 25% of the metallic weighting substance, then subjecting the silk to an alkali bath to neutralize the acids, then subjecting the silk to a hardening solution, then washing the silk, then impregnating the silk in a tin solution substantially as and for the purpose described, then again neutralizing the metallic salts by subjecting the silk to an alkali bath, and finally washing and dyeing the silk.

In testimony whereof I hereunto affix my signature.

EUGENE L. MAUPAI.